United States Patent [19]
Jeon

[11] Patent Number: 6,108,147
[45] Date of Patent: Aug. 22, 2000

[54] SELECTIVE DISK PARTITIONING/ DUPLICATING METHOD FOR DUPLICATION A HARD DISK

[75] Inventor: Young-Il Jeon, Soowon-shi, Rep. of Korea

[73] Assignee: SamSung Electronics Co., Ltd., Suwon, Rep. of Korea

[21] Appl. No.: 08/897,758

[22] Filed: Jul. 21, 1997

[30] Foreign Application Priority Data

Jul. 20, 1996 [KR] Rep. of Korea ...................... 96-29486

[51] Int. Cl.$^7$ ....................................................... G11B 5/86
[52] U.S. Cl. ........................................ 360/15; 395/497.04
[58] Field of Search ......................... 360/15, 48; 369/84; 395/497.04, 497.01, 438, 439; 711/111, 112, 170, 173

[56] References Cited

U.S. PATENT DOCUMENTS 5,675,769  10/1997  Ruff et al. ......................... 395/497.04

*Primary Examiner*—Andrew L. Sniezek
*Attorney, Agent, or Firm*—Robert E. Bushnell, Esq.

[57] ABSTRACT

Hard disk duplicating method is disclosed in which information are selectively duplicated from a source hard disk to a destination hard disk. The source hard disk is divided into at least two partitions and information are discontinuously stored in the partitions. The method comprises the step of selectively duplicating the data stored in the partitions to the destination hard disk on the basis of the starting and ending positions, even though the information is discontinuously stored on the source hard disk.

12 Claims, 5 Drawing Sheets

SELECTIVE DISK PARTITIONING/ DUPLICATING METHOD FOR DUPLICATION A HARD DISK

CLAIM OF PRIORITY

This application makes reference to, incorporates the same herein, and claims all benefits accruing under 35 U.S.C §119 from an application entitled Hard Disk Duplicating Method earlier filed in the Korean Industrial Property Office on Jul. 20, 1996, and there duly assigned Ser. No. 96-29486 by that Office.

FIELD OF THE INVENTION

The present invention relates to a hard disk duplicating method, and more particularly to a method for selectively duplicating information from a data storage source to a destination hard disk.

BACKGROUND OF THE INVENTION

Hard disks are digital data storage devices which may be used in computers in order to store large amounts of information. The hard disk is made of, for example, an aluminum alloy plate also known as a "platter". Coated on the aluminum alloy plate is a magnetic film on which carbon is deposited so as to store data thereon.

To duplicate large amounts of information on respective hard disks during the fabrication of hard disk drives, a hard disk copier machine has been utilized. Such a hard disk copier machine can simultaneously duplicate information of a source storage device (e.g., a source hard disk) on several destination hard disks.

The disk copier machine can duplicate information from the source hard disk to the destination disk drives in accordance with three typical methods, a first method of which is to divide source data by mega byte and continuously duplicate all of the divided source data on the destination hard disk from a starting position to a predefined position, a second method of which is to obtain cylinder, head and sector information related to the source data and continuously duplicate the source data from the starting position of the hard disk to the designated position in accordance with the obtained information, and a third method of which is to detect position information of the hard disk related to the source data and continuously duplicate the source data from the starting position to the detected ending position.

In the event that source data on the source hard disk is duplicated on a destination hard disk using any one of the above described methods, and if the source data is discontinuously distributed over the source hard disk, the disk copier machine must read out the source data through the whole region of the source hard disk so as to duplicate them on the destination hard disk. Thus, it takes a long time to duplicate information from a source hard disk to a destination hard disk. This is because even empty spaces of the source hard disk where data is not stored are duplicated on the destination hard disk. More specifically, with the recent increase in capacity of a hard disk, it takes a further long time to duplicate information from a source hard disk to a destination hard disk.

As stated above, if data is discontinuously stored over the source hard disk, or if the source hard disk is divided into at least two partitions and the data are discontinuously stored in the partitions, a disk copier machine can recognize only a first of the two partitions as the whole area of disk and duplicate the data stored on the first partition to the destination hard disk. Thus, the disk copier machine cannot recognize a second of the two partitions and thereby data stored on the second partition cannot be duplicated to the destination hard disk.

SUMMARY OF THE INVENTION

It is therefore an object of the present invention to provide a more efficient method of rapidly duplicating information from a source hard disk to several destination hard disks at once even though information are discontinuously stored on the source hard disk.

It is another object of the present invention to provide a more efficient method of selectively duplicating information from a source hard disk to several destination hard disks at once.

According to an embodiment of the present invention, a disk duplicating method is provided for duplicating information from a source hard disk, which is divided into at least two partitions and in which data are discontinuously stored in those partitions, to at least one destination hard disk. The method comprises steps of discriminating whether the method is selected as a selective duplication in rewsponse to a key entry; performing a typical disk duplicating method for duplicating said information from a starting position of the source hard disk to a designated position thereof when the method is not selected; performing key entries of starting and ending positions of each of partition when the method is selected; and selectively duplicating said data stored in the partitions to the destination hard disk on the basis of the starting and ending positions.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1A:
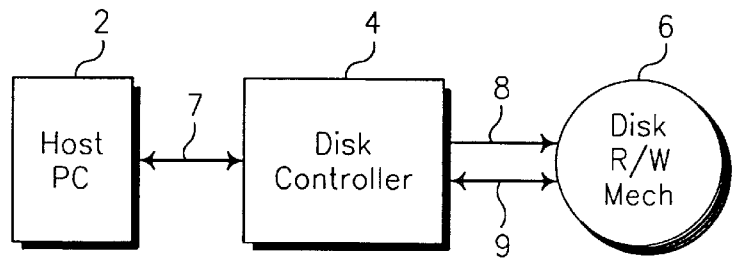
FIG. 1A illustrates the interfacing of a host computer with a disk read/write mechanism.

FIG. 1A shows a basic arrangement for interfacing a host computer 2 with a disk read/write mechanism 6. A microprocessor based disk controller 4, which includes a data storage buffer, is required for such an interface to accept read and write commands from host computer 2 via input/output bus 7 and to control disk read/write mechanism 6 via control lines 8 to read and write information from/to one or more rotating hard disks via information line 9.

Figure 1B:
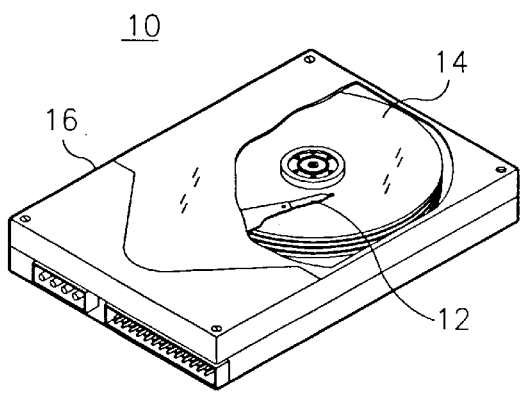
FIG. 1B illustrates the disk read/write mechanism (e.g., hard disk drive) shown in FIG. 1A.

Disk read/write mechanism 6 can be, for instance, a hard disk drive 10 which is schematically shown in FIG. 1B. Hard disk drive 10 typically contains five main sections, a data storage media 14, a spindle motor (not shown), a head 12, a case housing 16 and a hard disk controller (not shown) which can be, for instance, the disk controller 4 in FIG. 1A. The single motor is provided to rotate the data storage media, for example, hard disk 14 and head 12 to read and write data from/to media 14. The hard disk controller is typically located at the lower side of hard disk drive 10. Hard disk 14 is made of, for example, an aluminum alloy plate also known as a "platter". Coated on the aluminum alloy plate is a magnetic film on which carbon is deposited so as to store data thereon.

To duplicate large amounts of information on respective hard disks during the fabrication of hard disk drives, a hard disk copier machine has been utilized. Such a hard disk copier machine can simultaneously duplicate information of a source hard disk on several destination hard disks.

Figure 2:
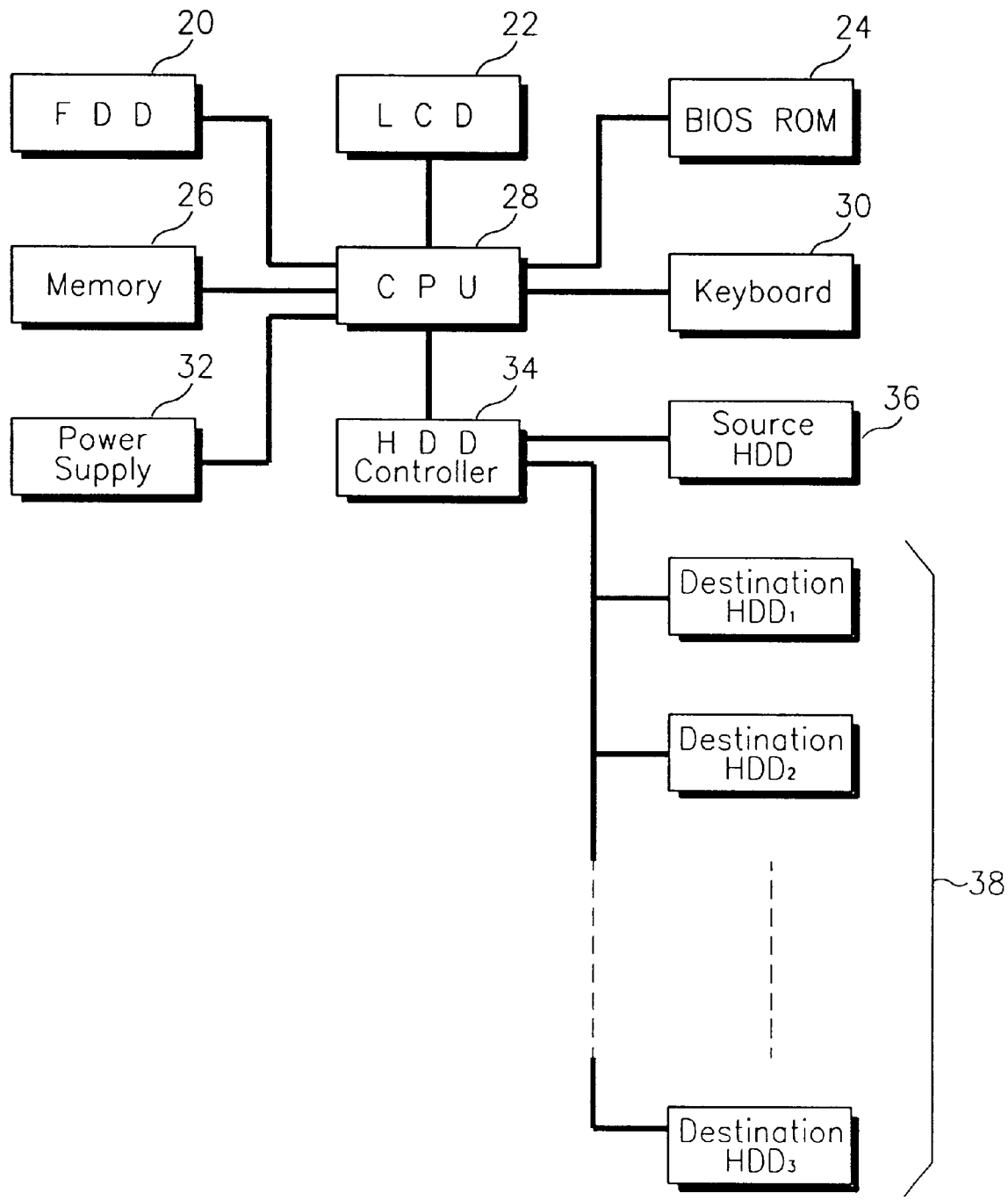
FIG. 2 is a block diagram of the hard disk drive shown in FIG. 1B.

FIG. 2 shows the configuration of a typical disk copier machine. In FIG. 2, the disk copier machine is composed of floppy disk drive 20, LCD panel 20 for displaying messages, ROM (Read Only Memory) 24 for storing BIOS (Basic Input Output System) programs, main memory section 26, CPU 28, keyboard 30 serving as a user control panel, power supply 32 and HDD (Hard Disk Drive) controller 34. HDD controller 34 is provided for controlling source HDD 36 and several destination HDD's 38 in order to duplicate information of the hard disk in source HDD 36 on respective hard disks of destination HDD's 38. Source HDD 36 serves as a source hard disk and each destination HDD 38 serves as a destination storage device.

Figure 3:
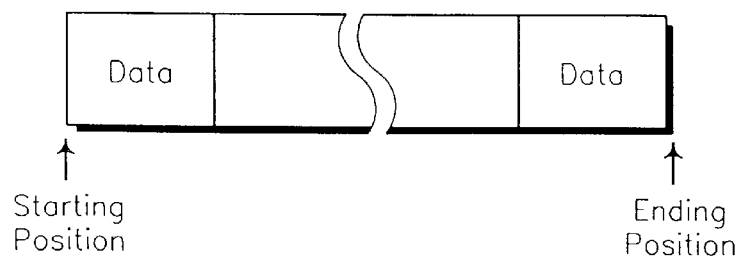
FIG. 3 illustrates the organization of the hard disk serving as a source hard disk.

The above described disk copier machine for duplicating a source hard disk onto a large number of destination storage devices utilizes the method of detecting position information of the hard disk related to the source data and continuously duplicate the source data from the starting position to the detected ending position, as shown in FIG. 3.

Figure 4:
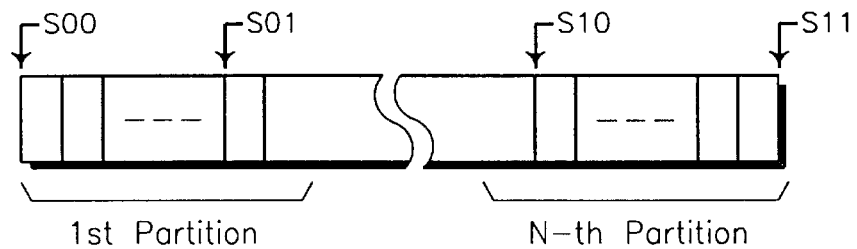
FIG. 4 illustrates the organization of the source hard disk so as to explain discontinuous allocations of information on the source hard disk.
Figure 5:
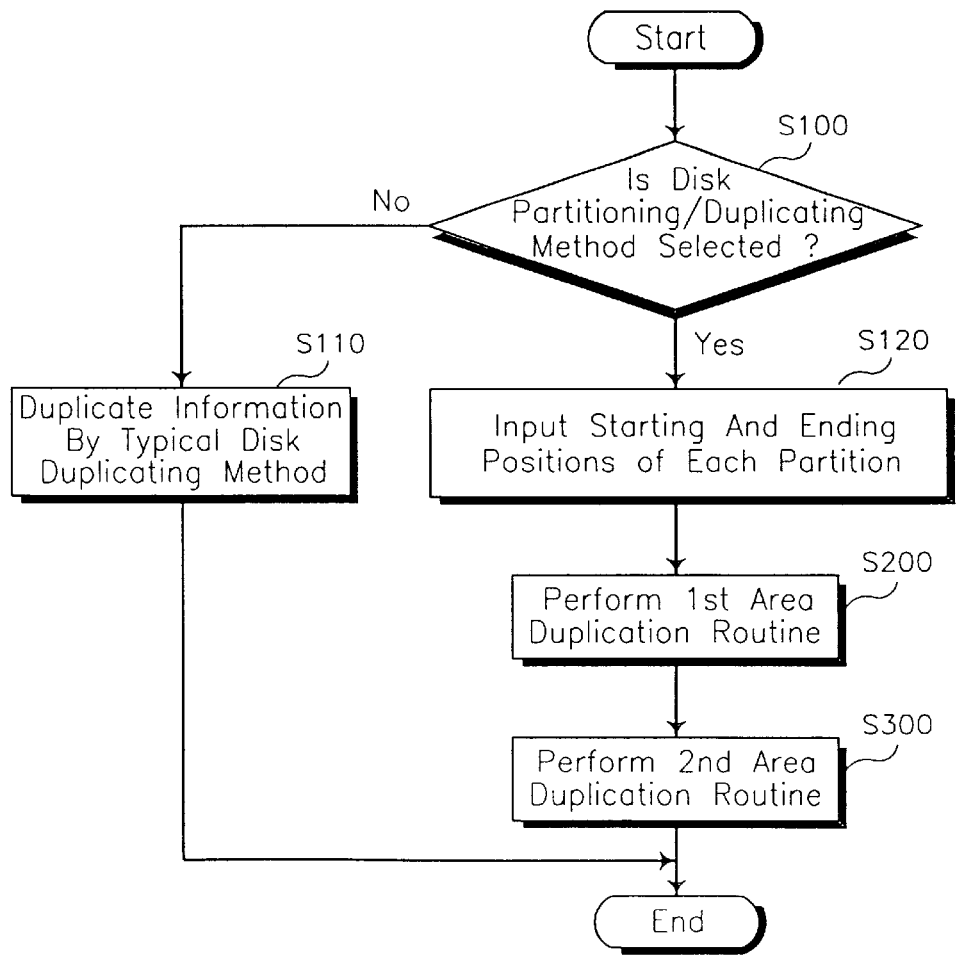
FIG. 5 is a flow chart illustrating the novel method of duplicating information from a source hard disk to a destination hard disk in accordance with a preferred embodiment of the present invention.

FIG. 4 illustrates the organization of a source hard disk. In FIG. 4, the source hard disk can be divided into consecutive partitions (physical divisions in the disk drive), for instance, a first partition S00~S01, . . . , N-th partition S10~S11. FIG. 5 illustrates a duplicating program which is executed in accordance with the novel method of duplicating information from a source hard disk to a destination hard disk. The duplicating program is executed in a disk copier machine.

Referring to FIG. 5, a novel disk duplicating method in accordance with the present invention allows selective duplication of information stored on the source hard disk to a destination hard disk even though the information is discontinuously stored on the source hard disk. With the novel disk duplication method, parts of the source hard disk where data is not stored are not accessed nor duplicated on the destination hard disk by the selective duplication.

Referring again to FIG. 5, it is discriminated at step S100 whether a disk partitioning/duplicating method is selected as the selective duplication in response to a key entry. The selection of the disk partitioning/duplicating method means that information, for instance, specific operating system programs, are discontinuously stored on the source hard disk in which more than two partitions are divided. If the result of step S100 is negative, the control proceeds to step S110, wherein a typical disk duplicating method as described above is performed so as to duplicate the specific operating system programs discontinuously stored on the whole area (i.e., an area from a starting position to a designated position) of the source hard disk to a destination hard disk. If the result of step S100 is affirmative, the control proceeds to step S120 wherein the starting and ending position information of each partition are input. For example, a first of the partitions is defined by a first area between starting and ending positions S00 and S01 and a second of the partitions is defined by a second area between starting and ending positions S10 and S11, as shown in FIG. 4. The position information is stored in a memory of the disk copier machine as shown in FIG. 6.

Next, the control proceeds to step S200, wherein a first area duplication routine is performed so that data stored on the first area between the positions S00 and S01 is read out and duplicated on the destination hard disk. After the duplication of the first area, the control proceeds to step S300, wherein a second area duplication routine is performed so that data stored on the second area between the positions S10 and S11 is read out and duplicated on the destination hard disk.

Figure 7:
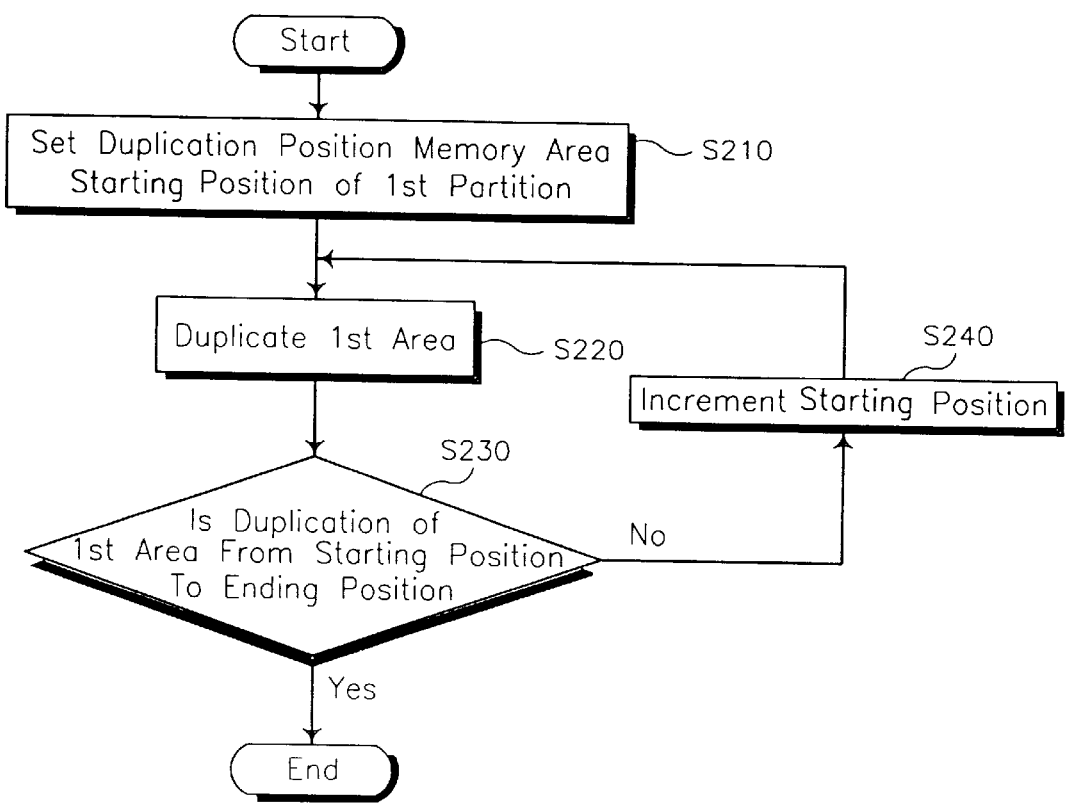
FIGS. 7 and 8 are flow charts illustrating the process steps of the first and second area duplication routines of the disk duplication method, respectively.
Figure 8:
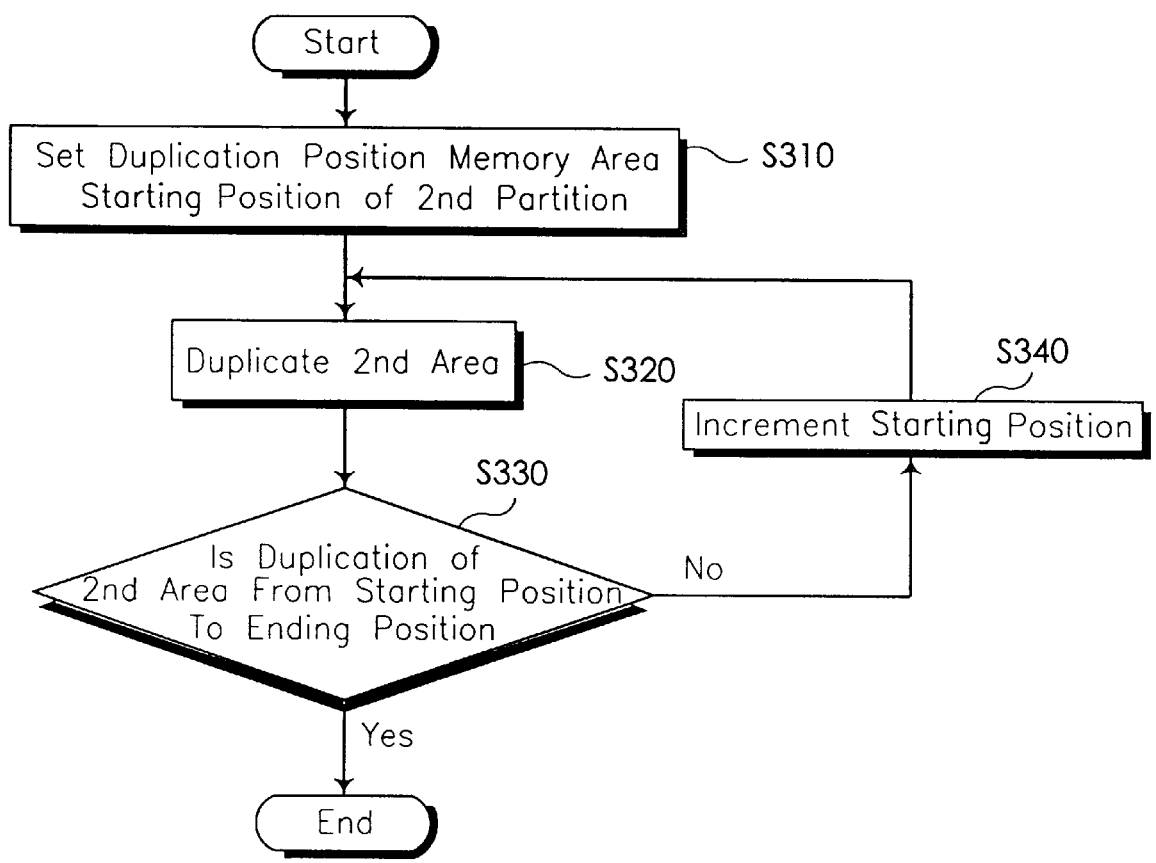

FIGS. 7 and 8 illustrate the process steps of the first and second area duplication routines, respectively.

Figure 6:
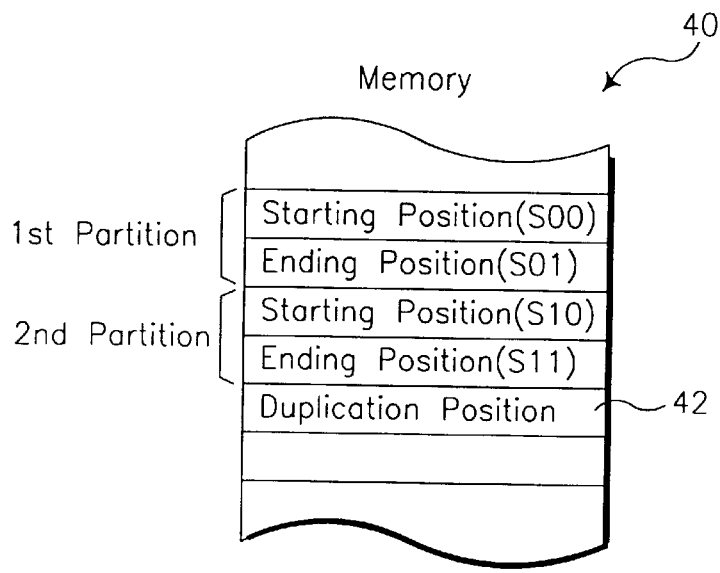
FIG. 6 illustrates position information which are stored in a memory of the disk copier machine so as to explain the disk duplicating method of FIG. 5.

As shown in FIG. 7, at step S210, a duplication position memory area 42, see FIG. 6, of the memory is set to be the starting position S00 of the first area. At step S220, data of the source hard disk is duplicated on the destination hard disk on the basis of the starting position information stored in the memory area 42. It is discriminated at step S230 whether the duplication of data from the starting position S00 to the ending position S01 (e.g., data stored in the first area) is completed. If so, the first area duplication routine is terminated, and if not, the control proceeds to step S240, wherein the starting position information stored in memory area 42 is incremented so that the duplication of data from the starting position S00 to the ending position S01 is continuously performed.

Referring to FIG. 8, at step S310, the duplication position memory area 42 of the memory is set to be the starting position S10 of the second area. At step S320, data of the source hard disk is duplicated on the destination hard disk on the basis of the starting position information stored in memory area 42. It is discriminated at step S330 whether the duplication of data from the starting position S10 to the ending position S11 (e.g., data stored in the second area) is completed. If so, the second area duplication routine is terminated, and if not, the control proceeds to step S340, wherein the starting position information stored in the memory area 42 is incremented so that the duplication of data from the starting position S10 to the ending position S11 is continuously performed.

As stated above, a disk duplicating method of the present invention allows selective duplication of information stored on a source hard disk to a destination hard disk even though the information are discontinuously stored on the source hard disk. It is possible to considerably reduce the time required for duplicating information, such as specific operating system programs, of the source hard disk to the destination hard disk by means of by the selective duplication.

What is claimed is:

1. A method of duplicating information from a source hard disk to at least one destination hard disk, said method comprising the steps of:

discriminating whether a disk partitioning and duplicating method is selected in response to a key entry via an input device;

performing a first disk duplicating method by directly duplicating said information from the source hard disk to said destination hard disk, when said disk partitioning and duplicating method is not selected;

performing key entries of starting and ending positions for partitioning said destination hard disk, when said disk partitioning and duplicating method is selected; and performing a second disk duplicating method by selectively duplicating data stored in partitions of said source hard disk to respective partitions of said destination hard disk on the basis of said starting and ending positions.

2. The method according to claim 1, wherein the step of performing said key entries comprises the steps of:

storing said starting and ending positions of a first of said partitions of said destination hard disk to a memory area of a memory; and storing said starting and ending positions of a second of said partitions to said memory area.

3. The method according to claim 2, wherein the step of performing a second disk duplicating method by selectively duplicating said data comprises the steps of:

duplicating the data of a first partition of said source hard disk to said first partition of said destination hard disk on the basis of said starting and ending positions of said first of said partitions of said destination hard disk stored in said memory area of said memory; and duplicating the data of a second partition of said source hard disk to said second partition of said destination hard disk on the basis of said starting and ending positions of said second of said partitions of said destination hard disk stored in said memory area of said memory.

4. The method according to claim 3, wherein the step of duplicating the data of said first partition of said source hard disk to said first partition of said destination hard disk comprises the steps of:

setting a duplication position memory area of said memory to be the starting position of said first partition of said destination hard disk;

duplicating the data of said first partition of said source hard disk to said first partition of said destination hard disk on the basis of the starting position set in said duplication position memory area;

discriminating whether said step of duplicating the data of said first partition of said source hard disk to said first partition of said destination hard disk is completed;

performing said step of duplicating the data of said second partition of said source hard disk to said second partition of said destination hard disk when it is determined that said step of duplicating the data of said first partition of said source hard disk to said first partition of said destination hard disk is completed; and incrementing said starting position stored in said duplication position memory area so as to continuously perform said step of duplicating the data of said first partition of said source hard disk to said first partition of said destination hard disk until said step of duplicating the data of said first partition of said source hard disk to said first partition of said destination hard disk is determined to have been completed.

5. The method according to claim 4, wherein the step of duplicating the data of said second partition of said source hard disk to said second partition of said destination hard disk comprises the steps of:

setting said duplication position memory area of said memory to be the starting position of said second partition of said destination hard disk;

duplicating the data of said second partition of said source hard disk to said second partition of said destination hard disk on the basis of the starting position of said second partition set in said duplication position memory area;

discriminating whether said step of duplicating the data of said second partition of said source hard disk to said second partition of said destination hard disk is completed;

terminating said partitioning and duplicating method when it is determined that said step of duplicating the data of said second partition of said source hard disk to said second partition of said destination hard disk is completed; and incrementing said starting position of said second partition stored in said duplication position memory area so as to continuously perform said step of duplicating the data of said second partition of said source hard disk to said second partition of said destination hard disk until said step of duplicating the data of said second partition of said source hard disk to said second partition of said destination hard disk is determined to have been completed.

6. A method of duplicating information from a source hard disk, which may be divided into more than one partition and in which data is discontinuously stored in said partitions, to at least one destination hard disk, said method comprising the steps of:

discriminating whether a disk partitioning and duplicating method is selected in response to a key entry;

performing a first disk duplicating method by obtaining cylinder, head and sector information related to the data stored on said source hard disk and continuously duplicating the data from the source hard disk to a position on said destination hard disk in accordance with said cylinder, head and sector information, when said disk partitioning and duplicating method is not selected;

inputting, when said source hard disk is known to be partitioned, starting and ending position information corresponding to each of said partitions of said source hard disk, for partitioning said destination hard disk, when said disk partitioning and duplicating method is selected; and performing a second disk duplicating method by selectively duplicating said data stored in each of said partitions of said source hard disk to corresponding partitions of said destination hard disk on the basis of said starting and ending position information.

7. The method according to claim 6, wherein the step of inputting comprises the steps of:

storing starting and ending position information corresponding to a first partition of said source hard disk in a first memory area of a memory; and storing starting and ending position information corresponding to a each subsequent partition of said source hard disk in a respective subsequent memory area of said memory.

8. The method according to claim 7, wherein the step of performing a second disk duplicating method by selectively duplicating said data comprises the steps of:

duplicating the data of said first partition of said source hard disk to a first partition of said destination hard disk, on the basis of said starting and ending position information stored in said first memory area of said memory; and subsequently duplicating the data of each said subsequent partition of said source hard disk to the corresponding subsequent partition of said destination hard disk, on the basis of said starting and ending position information stored in each said subsequent memory area of said memory.

9. The method according to claim 8, wherein the step of duplicating data of said first partition comprises the steps of:

setting duplication position information by storing said starting position information of said first partition stored in said first memory area of said memory into a duplication position memory area of said memory;

duplicating the data of said first partition of said source hard disk to said first partition of said destination hard disk on the basis of the duplication position information set in said duplication position memory area;

determining whether said step of duplicating the data of said first partition of said source hard disk to said first partition of said destination hard disk is completed;

duplicating the data of a next partition of said source hard disk to a respective partition of said destination hard disk when it is determined that said step of duplicating the data of said first partition of said source hard disk to said first partition oof said destination hard disk is completed; and incrementing said duplication position information stored in said duplication position memory area so as to continuously perform said step of duplicating the data of said first partition of said source hard disk to said first partition of said destination hard disk until said step of duplicating the data of said first partition of said source hard disk to said first partition of said destination hard disk is determined to have been completed.

10. The method according to claim 9, wherein the step of duplicating the data of said next partition comprises the steps of:

setting duplication position information by storing said starting position information of said stored in the next memory area of said memory into said duplication position memory area of said memory;

duplicating the data of said next partition of said source hard disk to the corresponding next partition of said destination hard disk on the basis of the duplication position information set in said duplication position memory area;

determining whether said step of duplicating the data of said next partition of said source hard disk to the corresponding next partition of said destination hard disk is completed;

incrementing said duplication position information stored in said duplication position memory area so as to continuously perform said step of duplicating the data of said next partition of said source hard disk to the corresponding next partition of said destination hard disk until said step of duplicating the data of said next partition of said source hard disk to the corresponding next partition of said destination hard disk is determined to have been completed; and repeating each of said setting, duplicating, determining and incrementing steps until each said subsequent partition of said source hard disk has been duplicated on said destination hard disk.

11. The method according to claim 9, wherein said step of determining whether said step of duplicating the data of said first partition of said source hard disk to said first partition of said destination hard disk is completed comprises the step of determining whether said duplication position information corresponds to said ending position information of said first partition stored in said first memory area.

12. The method according to claim 10, wherein said step of determining whether said step of duplicating the data of said next partition of said source hard disk to the corresponding next partition of said destination hard disk is completed comprises the step of determining whether said duplication position information corresponds to said ending position information of said next partition stored in said next memory area.

* * * * *